United States Patent
Yoo et al.

(10) Patent No.: US 12,479,871 B2
(45) Date of Patent: Nov. 25, 2025

(54) METHOD OF PREPARING SYMMETRICAL PHOSPHATE-BASED COMPOUND

(71) Applicant: SOULBRAIN CO., LTD., Gyeonggi-do (KR)

(72) Inventors: Dae Hwan Yoo, Gyeonggi-do (KR); Jae Yeol Ma, Gyeonggi-do (KR); Seok Jong Lee, Gyeonggi-do (KR); Kwang Ju Jung, Gyeonggi-do (KR); Weon Ju Yu, Gyeonggi-do (KR)

(73) Assignee: SOULBRAIN CO., LTD., Gyeonggi-do (KR)

( * ) Notice: Subject to any disclaimer, the term of this patent is extended or adjusted under 35 U.S.C. 154(b) by 417 days.

(21) Appl. No.: 18/033,728

(22) PCT Filed: Oct. 28, 2021

(86) PCT No.: PCT/KR2021/015276
§ 371 (c)(1),
(2) Date: Apr. 25, 2023

(87) PCT Pub. No.: WO2022/092835
PCT Pub. Date: May 5, 2022

(65) Prior Publication Data
US 2023/0399349 A1    Dec. 14, 2023

(30) Foreign Application Priority Data
Oct. 29, 2020  (KR) .................... 10-2020-0142168

(51) Int. Cl.
*C07F 9/6574*    (2006.01)

(52) U.S. Cl.
CPC .................. *C07F 9/65742* (2013.01)

(58) Field of Classification Search
CPC ..................................... C07F 9/65742
USPC .......................................... 558/83
See application file for complete search history.

(56) References Cited

FOREIGN PATENT DOCUMENTS

| | | |
|---|---|---|
| CN | 110117298 A | 8/2019 |
| GB | 770419 A | 3/1957 |

OTHER PUBLICATIONS

Baraniak J. et al., "Electrophilic catalysis of N—> 0 phosphyl migration" Tetrahedron Letters, vol. 32, Nr.: 1, pp. 137-140 (Jan. 1, 1991).
Bohlen B., et al., "Substitutionen und oxidative Additionen an 2-Chlor-4, 4, 5, 5-tetrakis (trifluormethyl)-1, 3, 2-dioxaphospholan" Zeitschrift für anorganische und allgemeine Chemie, vol. 513, No. 6, pp. 199-207 (Jan. 1, 1984).
Nycz J., et al., "Reductive cleavage of the halogen-phosphorus, oxygen-phosphorus and phosphorus-phosphorus ponds with alkali metals" Phosphorus, Sulfur, and Silicon and the Related Elements, vol. 161, No. 1, pp. 39-59 (Jan. 1, 2000).

*Primary Examiner* — Kristin A Vajda
(74) *Attorney, Agent, or Firm* — SZDC Law PC

(57) ABSTRACT

The present invention relates to a method of preparing a symmetrical phosphate-based compound. According to the method of the present invention, since a dinucleating agent is used in a hydrophobic solvent under a base-free condition, the yield of a desired compound may be increased due to excellent reaction stability and reduced side reactions.

16 Claims, No Drawings

METHOD OF PREPARING SYMMETRICAL PHOSPHATE-BASED COMPOUND

This application is the National Stage Application of PCT/KR2021/015276, filed on Oct. 28, 2021, which claims priority to Korean Patent Application No. KR 10-2020-0142168, filed on Oct. 29, 2020, which is incorporated by reference for all purposes as if fully set forth herein.

TECHNICAL FIELD

The present invention relates to a method of preparing a symmetrical phosphate-based compound, and more particularly, to a method of preparing a symmetrical phosphate-based compound, characterized in that the storage stability of synthetic reagents used in a dinucleation reaction is excellent, reactions are easily controlled, and economics is excellent due to the high yield of a desired compound due to reduced side reactions.

BACKGROUND ART

When a phosphate-based compound obtained using a cyclic compound (cyclic P—X, also called hyproxy type, wherein X represents halogen) as a starting material is subjected to a dinucleation reaction, $P^{5+}$ is bonded to the phosphate-based compound through oxygen to form a symmetrical phosphate-based compound having a P—O—P structure as a skeleton. In this case, a —O—P(=O)—O—P(=O)—O— structure or a —P(=O)—O—(P=O)— structure may be exemplified.

The symmetrical phosphate-based compound (—O—P(=O)—O—P(=O)—O— or —P(=O)—O—(P=O)—) includes the form of —PO—O—OP— and has been used in various industrial processes as functional materials such as fuel additives, additives for urethane reactions, and electrolyte solutions for lithium-ion batteries.

Accordingly, research on a method of efficiently synthesizing a symmetrical phosphate-based compound in high yield is being actively conducted. For example, a technique using a hyproxy-type compound as a starting material; and sodium acetate (NaCOOR), a mixture of pyridine ($C_5H_5N$) and water, or phosphorus pentoxide ($P_4O_{10}$) as a dinucleation reaction reagent is known.

Among the dinucleation reaction reagents, sodium acetate is difficult to store and manage because sodium acetate is highly reactive with water. In addition, due to acetate-based materials produced as by-products after reaction, decomposition occurs and purity is reduced. Another by-product, NaCl, requires a separate treatment process.

When using a mixture of pyridine and water as a dinucleation reaction reagent, a process for treating a pyridinium salt produced as a by-product is required. When using phosphorus pentoxide, the yield of a desired compound may be reduced, and a cyclic phosphite-based compound having an ethylene glycol skeleton may be produced instead of a desired symmetrical phosphate-based compound. In addition, there is a problem in that a desired product is changed into a hydroxy form due to generated water. Therefore, development of a technology suitable for mass production is still required.

DISCLOSURE

Technical Problem

Therefore, the present invention has been made in view of the above problems, and it is one object of the present invention to provide a method of preparing a symmetrical phosphate-based compound.

The above and other objects can be accomplished by the present invention described below.

Technical Solution

In accordance with one aspect of the present invention, provided is a method of preparing a symmetrical phosphate-based compound, the method including:
synthesizing a compound represented by Chemical Formula 2 below by reacting a compound represented by Chemical Formula 1 below with a dinucleating agent in a hydrophobic solvent under a base-free condition, wherein the reaction is performed at 0 to 40° C.:

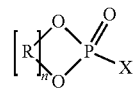

[Chemical Formula 1]

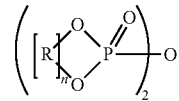

[Chemical Formula 2]

wherein, in Chemical Formulas 1 and 2, R is a substituted or unsubstituted alkylene having 1 to 3 carbon atoms; X is chlorine (Cl), bromine (Br), fluorine (F), or iodine (I); and n is an integer from 1 to 5, wherein a substituent is independently selected from a halogen, a hydroxyl group, an alkyl group having 1 to 8 carbon atoms, a heteroalkyl group having 3 to 6 carbon atoms, or an aryl group having 6 to 10 carbon atoms, and the alkyl group, heteroalkyl group, and aryl group are independently substituted with a halogen.

The dinucleating agent may be water.

Based on 100 parts by weight of the compound represented by Chemical Formula 1, the dinucleating agent may be added in an amount of 1 to 15 parts by weight.

The dinucleating agent may be added dropwise at a temperature of 0 to 10° C.

The hydrophobic solvent may be tetrahydrofuran.

The hydrophobic solvent from which moisture has been removed may be added.

Based on 100 parts by weight of the compound represented by Chemical Formula 1, the hydrophobic solvent may be added in an amount of 50 parts by weight or more.

The reaction may include preparing a reactant solution by mixing the hydrophobic solvent and the compound represented by Chemical Formula 1 under an inert atmosphere; adding a dinucleating agent dropwise to the reactant solution at a first temperature and stirring the reactant solution to remove hydrogen chloride and obtain a hyproxy-type intermediate; and performing stirring at a second temperature to remove hydrogen chloride from the compound represented by Chemical Formula 1 and the hyproxy-type intermediate and perform condensation.

The first temperature may be 0 to 10° C., and the second temperature may be 0 to 40° C.

The reaction may further include performing depressurization and distillation to remove volatile substances.

The reaction may further include performing recrystallization for purification.

The compound represented by Chemical Formula 2 may include one or more selected from the group consisting of compounds represented by Chemical Formulas 2-1 to 2-9 below.

[Chemical Formulas 2-1 to 2-9]

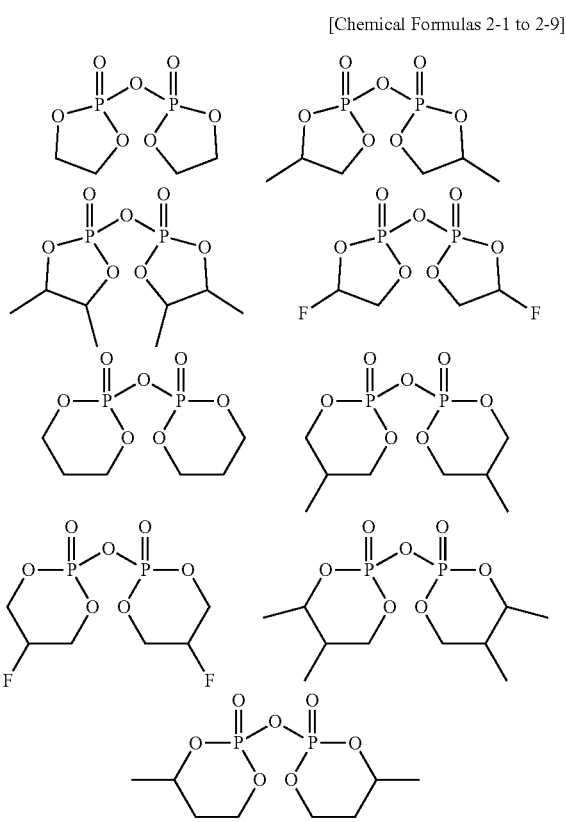

A yield of the reaction may be 60% or more.

The compound represented by Chemical Formula 1 may be obtained by oxidizing a halohyproxy-based compound in a hydrophobic solvent having a boiling point higher than that of the hydrophobic solvent.

The halohyproxy-based compound may be obtained by reacting phosphorus trichloride and ethylene glycol in a hydrophobic solvent having a boiling point lower than that of the hydrophobic solvent.

The compound represented by Chemical Formula 1 may be 2-chloro-2-oxo-1,3,2-dioxaphospholane, 2-bromo-2-oxo-1,3,2-dioxaphospholane, 2-fluoro-2-oxo-1,3,2-dioxaphospholane, or 2-iodo-2-oxo-1,3,2-dioxaphospholane, and the compound represented by Chemical Formula 2 may be 2,2'-oxobis(1,3,2-dioxaphospholane 2-oxide).

Advantageous Effects

According to the present invention, the present invention has an effect of providing a method of preparing a symmetrical phosphate-based compound, characterized in that the storage stability of synthetic reagents used in a dinucleation reaction is excellent, reactions are easily controlled, and economics is excellent due to the high yield of a final compound due to reduced side reactions.

BEST MODE

Hereinafter, a method of preparing a symmetrical phosphate-based compound according to the present invention is described in detail.

The present inventors confirmed that, when synthesizing a desired symmetrical phosphate-based compound using a hyproxy-type compound as a starting material, when water was used alone as a base-free dinucleating agent, a hydrophobic solvent was used, and reaction temperature was controlled, the yield of the desired product was increased due to excellent reaction stability and reduced side reactions. Based on these results, the present inventors conducted further studies to complete the present invention.

As used in the present invention, the term "alkyl" includes straight-chain, branched-chain, or cyclic hydrocarbon radicals, and the term "alkylene" refers to a divalent radical derived from alkyl. For example, the alkylene includes methylene, ethylene, isobutylene, cyclohexylene, cyclopentylethylene, 2-propenylene, 3-butynylene, and the like.

As used in the present invention, the term "heteroalkyl group" refers to a linear or branched chain group consisting of 3 to 6 carbon atoms and 1 to 3 heteroatoms selected from the group consisting of O, N, P, Si, and S, and the nitrogen, sulfur, and phosphorus atoms may be selectively oxidized. The heteroatom(s), O, N, P, and S, may be located at any internal position of the heteroalkyl group. The heteroatom Si may be located at any position of the heteroalkyl group, including the position where an alkyl group is attached to the rest of a molecule.

As used in the present invention, in the expression "substituted or unsubstituted", "substitution" means that one or more hydrogen atoms in a hydrocarbon are each independently replaced with the same or different substituents.

In this case, a commonly used substituent may be used, and for example, the substituent is selected from among halo, alkyl, aryl, and arylalkyl.

For example, the method of preparing a symmetrical phosphate-based compound according to the present invention includes a step of synthesizing a compound represented by Chemical Formula 2 below by reacting a compound represented by Chemical Formula 1 below with a dinucleating agent in a hydrophobic solvent under a base-free condition, wherein the reaction is performed at 0 to 40° C. In this case, reaction stability may be excellent and side reactions may be reduced, thereby increasing yield.

Hereinafter, each of components required for preparing a symmetrical phosphate-based compound of the present invention will be described in detail.

Starting Material

In the present invention, for example, a starting material used in a dinucleation reaction may be a compound represented by Chemical Formula 1 below.

[Chemical Formula 1]

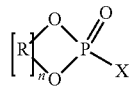

In Chemical Formula 1, R may be a substituted or unsubstituted alkyl group having 1 to 3 carbon atoms, X may be chlorine (Cl), bromine (Br), fluorine (F), or iodine (I), and n may be an integer from 1 to 5. Here, substitution may independently be selected from a halogen, a hydroxyl group, an alkyl group having 1 to 8 carbon atoms, a heteroalkyl group having 3 to 6 carbon atoms, or an aryl group having 6 to 10 carbon atoms, and the alkyl group, heteroalkyl group, and aryl group may independently be substituted with a halogen.

In Chemical Formula 1, for example, when X is chlorine (Cl), n may be 1, and R may be substituted or unsubstituted methylene. In this case, substitution may be performed with a methyl group, an ethyl group, or a fluoro group.

In Chemical Formula 1, for example, when X is chlorine (Cl), n may be 2, and each R may be substituted or unsubstituted methylene. In this case, substitution may be performed with a methyl group, an ethyl group, or a fluoro group.

In Chemical Formula 1, for example, when X is chlorine (Cl), n may be 3, and each R may be substituted or unsubstituted methylene. In this case, substitution may be performed with a methyl group, an ethyl group, or a fluoro group.

As a specific example, the compound represented by Chemical Formula 1 may be a compound represented by Chemical Formula 1-1 below.

[Chemical Formula 1-1]

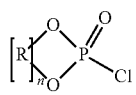

As a specific example, the compound represented by Chemical Formula 1 may be 2-chloro-2-oxo-1,3,2-dioxaphospholane, 2-bromo-2-oxo-1,3,2-dioxaphospholane, 2-fluoro-2-oxo-1,3,2-dioxaphospholane, or 2-iodo-2-oxo-1,3,2-dioxaphospholane.

Product

In the present disclosure, for example, a product prepared by subjecting the compound represented by Chemical Formula 1 described above to a dinucleation reaction to be described later may be a compound represented by Chemical Formula 2 below.

[Chemical Formula 2]

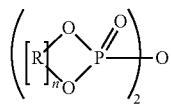

In Chemical Formula 2, R may be a substituted or unsubstituted alkylene having 1 to 3 carbon atoms, and n may be an integer from 1 to 5. Here, substitution may independently be selected from a halogen, a hydroxyl group, an alkyl group having 1 to 8 carbon atoms, a heteroalkyl group having 3 to 6 carbon atoms, or an aryl group having 6 to 10 carbon atoms, and the alkyl group, heteroalkyl group, and aryl group may independently be substituted with a halogen.

In Chemical Formula 2, for example, n may be 1, and R may be substituted or unsubstituted methylene. In this case, substitution may be performed with a methyl group, an ethyl group, or a fluoro group.

In Chemical Formula 2, for example, n may be 2, and each R may be substituted or unsubstituted methylene. In this case, substitution may be performed with a methyl group, an ethyl group, or a fluoro group.

In Chemical Formula 2, for example, n may be 3, and each R may be substituted or unsubstituted methylene. In this case, substitution may be performed with a methyl group, an ethyl group, or a fluoro group.

As a specific example, the compound represented by Chemical Formula 2 may include one or more selected from the group consisting of compounds represented by Chemical Formulas 2-1 to 2-9 below.

[Chemical Formulas 2-1 to 2-9]

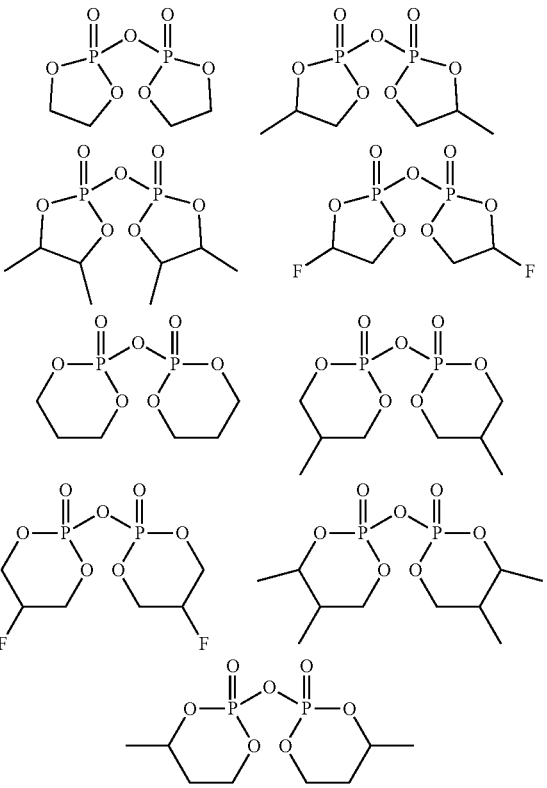

In addition, the compound represented by Chemical Formula 2 may be 2,2'-oxobis(1,3,2-dioxaphospholane 2-oxide).

Dinucleation Reaction

The preparation method of the present invention aims to obtain the compound represented by Chemical Formula 2 by subjecting the compound represented by Chemical Formula 1 described above as a starting material to a dinucleation reaction.

The dinucleation reaction is specifically described with reference to mechanisms represented by Reaction Formulas below.

[Reaction Formula 1]

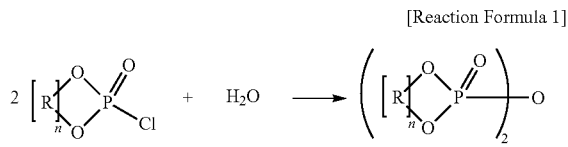

Reaction Formula 1 is preferably performed as a two-step reaction shown in Reaction Formula 2 below.

[Reaction Formula 2]

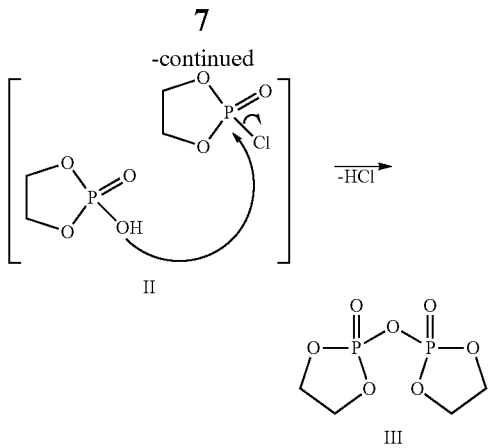

As shown in Reaction Formula 2, water used alone as a dinucleating agent attacks the halogen end of the compound (corresponding to the starting material) represented by I in a base-free state, replaces the halogen end with a hydroxyl group, and generates hydrochloric acid.

A compound represented by II produced in this way attacks the halogen end of the starting material of the present invention to produce a compound (corresponding to the target compound) represented by III while generating hydrochloric acid. Through this mechanism, reaction time may be reduced, reaction yield may be increased without side reactions, and reaction stability may be provided.

As shown in Reaction Formulas 1 and 2, in the dinucleation reaction of the present invention, instead of a conventional synthetic dinucleation reagent that is water-reactive and difficult to store and control, water is used alone as a dinucleating agent, and the reaction is performed under a base-free condition. Thus, reaction stability may be excellent, and yield may be increased due to reduced side reactions.

Hereinafter, a solvent, a dinucleating agent, and the like required in the dinucleation reaction shown in Reaction Formulas 1 and 2 will be described, and the specific conditions of the dinucleation reaction will be described.

Solvent for Dinucleation Reaction

A solvent effect is very important in organic reactions including the aforementioned dinucleation reaction, and reaction progress and yield may be greatly affected by the type of solvent. Accordingly, in the method of preparing a symmetrical phosphate-based compound according to the present invention, selection of a solvent is very important.

In the present invention, since a solvent should be able to dissolve the compound represented by Chemical Formula 1, which is the starting material, a hydrophobic solvent is preferably used. It is preferable to use a solvent capable of terminating a reaction without generating dimers in Intermediate II so that Intermediate II of Reaction Formula 2 described above is effectively dissolved.

Furthermore, production efficiency may be improved by using a solvent having a melting point below zero while having excellent miscibility with the dinucleating agent described later. In this case, problems that occur when water is used as the dinucleating agent may be minimized.

A hydrophobic solvent satisfying these properties may be tetrahydrofuran.

In addition, it is preferable to use the above-mentioned organic solvent in a dry state after removing moisture therefrom rather than using the organic solvent in an intact state when considering precise reaction control when water is used as the dinucleating agent.

For example, based on 100 parts by weight of the compound represented by Chemical Formula 1, the hydrophobic solvent may be used in an amount of 50 parts by weight or more, preferably 50 to 2,000 parts by weight. Within this range, reaction conversion rate and purity may be optimized.

Dinucleating Agent

In the present invention, it is preferable to use water alone as a synthetic reagent (in the present invention, also referred to as a "dinucleating agent") that performs a dinucleation reaction.

According to the mechanism of Reaction Formulas 1 and 2, water is introduced as a dinucleating agent in a suitable organic solvent, and hydrochloric acid is removed from the starting material in two steps. Accordingly, since volume ratio does not increase, production efficiency may be increased. Also, the purity and yield of a product may be increased. In addition, since the process of separating by-products from water is omitted, the above mechanism may be suitably applied to a mass production process.

That is, according to the present invention, the dinucleating agent is easy to control the reaction, and the intermediate produced during the dinucleation reaction also has reactivity according to electron donation with the starting material. Thus, an effect of synthesizing the symmetrical phosphate-based compound in high yield may be provided.

For example, based on 100 parts by weight of the compound represented by Chemical Formula 1, the dinucleating agent may be added in an amount of 1 to 15 parts by weight, preferably 3 to 10 parts by weight, more preferably 5 to 10 parts by weight. Within this range, reaction conversion rate and reaction rate may be optimized.

Catalyst for Dinucleation Reaction

As shown in Reaction Formulas 1 and 2, reaction efficiency is good even without using a separate catalyst for the dinucleation reaction. However, in general, when a catalyst is used, activation energy is reduced and reaction rate is increased.

When necessary, catalysts known in the art to be able to increase the reaction rate of the dinucleation reaction may be used.

Conditions and Time-Dependent Change of Dinucleation Reaction

For example, to optimize the efficiency of the reaction, the pH of the dinucleation reaction may be adjusted to 7 to 9, preferably 7 to 8, more preferably 7 to 7.5.

In addition, for example, the temperature of the first reaction of the dinucleation reaction may be adjusted to 0 to 10° C., preferably 0 to 5° C., and the temperature of the second reaction of the dinucleation reaction may be adjusted to 0 to 40° C., preferably 15 to 25° C. Within this range, the starting material may be sufficiently dissolved in the hydrophobic solvent before adding the dinucleating agent. In addition, even after adding the dinucleating agent, optimal conditions for performing the dinucleation reaction at room temperature may be achieved.

In addition, for example, the reaction time of the dinucleation reaction may be 6 hours or less. Preferably, the reaction time of the first reaction is 3 hours or less, and the reaction time of the second reaction is 3 hours or less. More preferably, the reaction time of the first reaction is 2 to 3 hours, and the reaction time of the second reaction is 2 to 3 hours.

In addition, for example, the dropping temperature of the dinucleating agent may be 0 to 10° C., preferably 0 to 5° C. Within this range, reaction stability may be imparted.

At this time, it is appropriate for pilot and mass production applications to mix the solvent and the starting material prior to adding the dinucleating agent dropwise and then cool to the aforementioned temperature range.

At this time, the dropping time of the dinucleating agent is not particularly limited as long as the aforementioned dropping temperature is maintained, but for example, the dropping time may be 1 hour or more, preferably 3 to 4 hours.

For example, the method of preparing a symmetrical phosphate-based compound according to the present invention includes a step of preparing a reactant solution by mixing the hydrophobic solvent and the compound represented by Chemical Formula 1 under an inert atmosphere; a step of adding a dinucleating agent dropwise to the reactant solution at a first temperature and stirring the reactant solution to remove hydrogen chloride and obtain a hyproxy-type intermediate; and a step of performing stirring at a second temperature to remove hydrogen chloride from the compound represented by Chemical Formula 1 and the hyproxy-type intermediate and performing condensation to obtain a symmetrical phosphate-based compound. In this case, reaction stability may be excellent, and yield may be increased due to reduced side reactions.

According to the present invention, hydrochloric acid generated during the reaction under a base-free reaction condition is removed in two steps. At this time, hydrochloric acid may be removed by controlling reaction conditions or stirring conditions under a base-free condition, for example, by applying harsh stirring conditions.

In addition, according to the method of preparing a symmetrical phosphate-based compound according to the present invention, for example, the purity of the compound represented by Chemical Formula 2 may be 90% or more, preferably 95% or more, more preferably 99% or more.

In addition, according to the method of preparing a symmetrical phosphate-based compound according to the present invention, for example, the yield of the compound represented by Chemical Formula 2 may be 60% or more, preferably 70 to 90%.

In the present disclosure, the yield is a value obtained by multiplying the mole of 100% stoichiometric reaction of the starting material by 100 based on the mole of the actually obtained product.

According to the method of preparing a symmetrical phosphate-based compound according to the present invention, the reaction may further include a step of performing depressurization and distillation to remove volatile substances. Hydrochloric acid, which is the volatile substance, may be removed.

In addition, the reaction may further include a step of performing recrystallization for purification.

In addition, according to the preparation method of the present invention, as described above, since the product is obtained in 100% purity or high purity and does not contain insoluble impurities, the reaction may be completed without post-processes such as filtration and purification.

The compound represented by Chemical Formula 1 may be obtained by oxidizing a halohyproxy-based compound in a hydrophobic solvent having a boiling point higher than that of the hydrophobic solvent, but the present invention is not limited thereto.

Specifically, the hydrophobic solvent may be benzene.

The oxidation reaction may be performed within a temperature range above room temperature and below the boiling point of the solvent, and the reaction temperature may be set higher than room temperature to minimize reaction time.

In addition, for example, the oxidation reaction may be performed for 12 hours or more, as a specific example, 24 to 84 hours.

Then, the solvent may be removed by depressurization and distillation, and purification may be performed to obtain a colorless product.

At this time, the colorless product may be Compound I of Reaction Formula 2 or Compound 2 of Reaction Formula 4 to be described later.

For example, the purification may be performed at 66 to 74° C. and 0.13 to 0.15 mbar.

The halohyproxy-based compound may be obtained by reacting phosphorus trichloride and ethylene glycol in a hydrophobic solvent having a boiling point lower than that of the hydrophobic solvent.

A related reaction mechanism may be represented by Reaction Formula 3 below.

[Reaction Formula 3]

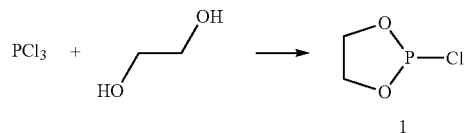

Specifically, the hydrophobic solvent may be dichloromethane or chloroform.

The reaction may be performed at room temperature for 0.5 to 12 hours.

Then, the solvent may be removed by depressurization and distillation, and purification may be performed to obtain a cyclic product (Compound 1 of Reaction Formula 3).

For example, the purification may be performed at 72 to 78° C. and 65 to 67 mbar.

Accordingly, when performing cyclization, oxidation, and dinucleation reactions using phosphorus trichloride as the initial starting material, the reaction mechanism may be represented by Reaction Formula 4 below.

[Reaction Formula 4]

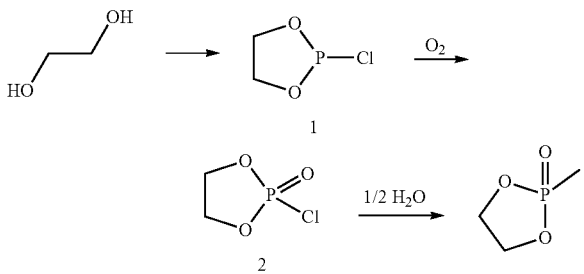

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Example 1

A dinucleation reaction was performed according to Reaction Formula 2 using 2-chloro-2-oxo-1,3,2-dioxaphospholane purchased from Sigma Aldrich to prepare 2,2'-oxybis(1,3,2-dioxaphospholane 2-oxide) (corresponding to the compound represented by Chemical Formula 3 of Reaction Formula 4: R=methylene; and n=2).

Specifically, a thermometer was installed in a 1 L four-necked reaction vessel, and 150 ml of tetrahydrofuran from which moisture had been removed and 2-chloro-2-oxo-1,3,2-dioxaphospholane purchased from Sigma Aldrich were added thereto under a nitrogen atmosphere and then cooled to 0 to 5° C.

Then, 1.26 g of water as a dinucleating agent was slowly added dropwise at an internal temperature of 5° C. or less, followed by stirring for 2 hours while maintaining the temperature.

The temperature was then slowly increased to room temperature, and additional stirring was performed for 2 hours. Then, the solvent was removed through depressurization and distillation, and filtration was performed through concentrated recrystallization to obtain 27.5 g of a solid product. Then, vacuum drying was performed, and the yield of the product was measured. As a results, the yield of the product was 78%.

As a result of $^1$H NMR spectrum analysis of the compound, an O—$CH_2$—$CH_2$—O group was observed at 4.68 to 4.49 ppm. $^{13}$C NMR and $^{31}$P NMR results are as follows. In addition, the purity of 2,2'-oxybis(1,3,2-dioxaphospholane 2-oxide) measured by gas chromatography was 98%.

$^1$H NMR (500 MHz, DMSO): 4.68-4.49 (m, 8H, O—$CH_2$—$CH_2$—O)
$^{13}$C NMR (176 MHz, CDCl$_3$): 67.01
$^{31}$P NMR (121 MHz, DMSO): 5.21

Example 2

The same procedure as in Example 1 was performed except that 2-chloro-2-oxo-1,3,2-dioxaphospholane obtained in Preparation Examples 1 and 2 below was used instead of 2-chloro-2-oxo-1,3,2-dioxaphospholane purchased from Sigma Aldrich. As a result, the yield and purity of a product were 85% and 99%, respectively.

$^1$H NMR (500 MHz, DMSO): 4.68-4.49 (m, 8H, O—$CH_2$—$CH_2$—O)
$^{13}$C NMR (176 MHz, CDCl$_3$): 67.01
$^{31}$P NMR (121 MHz, DMSO): 5.21

Preparation Example 1: Preparation of 2-chloro-1,3,2-dioxaphospholane

Cyclization reaction was performed according to Reaction Formula 4, and 2-chloro-1,3,2-dioxaphospholane (corresponding to Compound 1 of Reaction Formula 4) was prepared using phosphorus trichloride. At this time, dichloromethane, phosphorus trichloride, and ethylene glycol required for the reaction were purchased from Sigma Aldrich.

Specifically, using a frame-dried 500 mL round-bottom flask with a reflux system and a NaOH neutralizer, 137.3 g (1.000 mol) of phosphorus trichloride was diluted in 150 ml of anhydrous dichloromethane, and then 60.07 g (1.000 mol) of ethylene glycol was added dropwise thereto.

After reacting at room temperature for 2 hours, the solvent was removed by depressurization and distillation, and then purification was performed at 72 to 78° C. and 65 to 67 mbar to obtain 84 g of a cyclic product corresponding to Compound 1 of Reaction Formula 4. At this time, the yield was 67%.

$^1$H NMR (500 MHz, CDCl$_3$) 4.52-4.22 (m, 4H, O—CH2-CH2-O)
$^{13}$C NMR (176 MHz, CDCl$_3$) 65.29
$^{31}$P MR (283 MHz, CDCl$_3$): 167.80

Preparation Example 2: Preparation of 2-chloro-2-oxo-1,3,2-dioxaphospholane

An oxidation reaction was performed using 2-chloro-1,3,2-dioxaphospholane (corresponding to Compound 1 of Reaction Formula 4) obtained in Preparation Example 1 to prepare 2-chloro-2-oxo-1,3,2-dioxaphospholane (corresponding to Compound 2 of Reaction Formula 4).

Specifically, using a frame-dried 500 mL 3-neck flask with a reflux system, 20.0 g of the product obtained in Preparation Example 1 was diluted in 150 ml of benzene, and then stirring was performed at room temperature for 24 hours while passing oxygen.

After the reaction, the solvent was removed by depressurization and distillation, and purification was performed at 66 to 74° C. and 0.13 to 0.15 mbar to obtain 15.82 g of a colorless product corresponding to Compound 2 of Reaction Formula 4 (X=Cl, R=methylene, n=2, 2-chloro-2-oxo-1,3,2-dioxaphospholane). At this time, the yield was 70%.

$^1$H NMR (500 MHz, CDCl$_3$) 4.64-4.44 (m, 4H, O—$CH_2$—$CH_2$—O)
$^{13}$C NMR (176 MHz, CDCl$_3$) 66.54
$^{31}$P NMR (121 MHz, CDCl$_3$) 22.74.

Comparative Example 1

The same procedure as in Example 1 was performed except that diethyl ether was used as a solvent instead of tetrahydrofuran. As a result, the yield and purity of 2,2'-oxybis(1,3,2-dioxaphospholane 2-oxide) were 10% and 8%, respectively.

In addition, the yield and purity of the intermediate compound represented by Chemical Formula 2 of Reaction Formula 2 were 60% and 80%, respectively. Based on these results, it was confirmed that the reaction according to Reaction Formula 2 did not proceed properly to the final dinucleation product.

Comparative Example 2

The same procedure as in Example 1 was performed except that the dropping temperature of water was 15° C. As a result, the yield was 62%, and the purity was 73%. It was confirmed that when the dropping time was short or the internal temperature was high, aggregation occurred between the intermediate compound and the final compound, resulting in a decrease in yield and purity.

Comparative Example 3

The same procedure as in Example 1 was performed except that the dinucleation reaction temperature was increased to 50° C. As a result, the yield was 5%, and the purity was not measurable due to polymerization. Based on these results, it was confirmed that a polymerization reaction occurs when the dinucleation reaction temperature is high, and decrease in yield is more dramatic than change in purity when separating the polymer.

Comparative Example 4

The same procedure as in Example 1 was performed except that water and pyridine were used as a dinucleating agent instead of water. As a result, the yield was 65%, and the purity was 95%. In this case, when using a base, a concentration filter method using the difference in solubility of the reaction solvent may not be used. In addition, to remove the base, after filtering pyridinium salt, the remaining base and solvent are dried, the solvent is reintroduced, and recrystallization is performed. As a result, yield and purity are reduced.

As shown in the experimental results, in the case of Examples 1 and 2 in which base-free water was used alone as a dinucleating agent, the yield of the product was 78 to 85%, and the purity thereof was 95 to 100%.

On the other hand, in the case of Comparative Example 1 in which diethyl ether was used as a hydrophobic solvent instead of tetrahydrofuran, both yield and purity were reduced.

In addition, in the case of Comparative Example 2 in which the dropping temperature of the dinucleating agent was not adjusted within the proper range, both yield and purity were reduced.

In addition, in the case of Comparative Example 3 in which the temperature of the dinucleation reaction was not adjusted within the proper range, both yield and purity were reduced.

In addition, in the case of Comparative Example 4 without applying the base-free condition, the purification step was prolonged, and both purity and yield were reduced during separation.

In conclusion, when the compound represented by Chemical Formula 2 is synthesized by reacting the compound represented by Chemical Formula 1 with the dinucleating agent in the hydrophobic solvent, when the reaction is performed at 0 to 40° C. to synthesize the symmetrical phosphate-based compound, reaction stability may be excellent, and yield may be increased due to reduced side reactions.

The invention claimed is:

1. A method of preparing a symmetrical phosphate-based compound, comprising synthesizing a compound represented by Chemical Formula 2 below by reacting a compound represented by Chemical Formula 1 below with a dinucleating agent in a hydrophobic solvent under a base-free condition, wherein the reaction is performed at 0 to 40° C.:

[Chemical Formula 1]

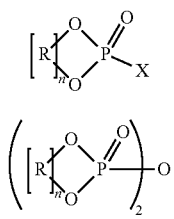

[Chemical Formula 2]

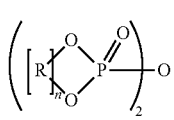

wherein, in Chemical Formulas 1 and 2, R is a substituted or unsubstituted alkylene having 1 to 3 carbon atoms; X is chlorine (Cl), bromine (Br), fluorine (F), or iodine (I); and n is an integer from 1 to 5, wherein a substituent is independently selected from a halogen, a hydroxyl group, an alkyl group having 1 to 8 carbon atoms, a heteroalkyl group having 3 to 6 carbon atoms, or an aryl group having 6 to 10 carbon atoms, and the alkyl group, heteroalkyl group, and aryl group are independently substituted with a halogen.

2. The method according to claim 1, wherein the dinucleating agent is water.

3. The method according to claim 1, wherein, based on 100 parts by weight of the compound represented by Chemical Formula 1, the dinucleating agent is added in an amount of 1 to 15 parts by weight.

4. The method according to claim 1, wherein the dinucleating agent is added dropwise at a temperature of 0 to 10° C.

5. The method according to claim 1, wherein the hydrophobic solvent is tetrahydrofuran.

6. The method according to claim 1, wherein the hydrophobic solvent from which moisture has been removed is added.

7. The method according to claim 1, wherein, based on 100 parts by weight of the compound represented by Chemical Formula 1, the hydrophobic solvent is added in an amount of 50 parts by weight or more.

8. The method according to claim 1, wherein the reaction comprises preparing a reactant solution by mixing the hydrophobic solvent and the compound represented by Chemical Formula 1 under an inert atmosphere;
adjusting a temperature of the reactant solution to a first temperature, adding a dinucleating agent dropwise thereto, and stirring the reactant solution to remove hydrogen chloride and obtain a hyproxy-type intermediate; and
adjusting the first temperature to a second temperature higher than the first temperature and performing stirring to remove hydrogen chloride from the compound represented by Chemical Formula 1 and the hyproxy-type intermediate and perform condensation.

9. The method according to claim 1, wherein the first temperature is 0 to 10° C., and the second temperature is 0 to 40° C.

10. The method according to claim 1, wherein the reaction further comprises performing depressurization and distillation to remove volatile substances.

11. The method according to claim 1, wherein the reaction further comprises performing recrystallization for purification.

12. The method according to claim 1, wherein the compound represented by Chemical Formula 2 comprises one or more selected from the group consisting of compounds represented by Chemical Formulas 2-1 to 2-9 below:

[Chemical Formulas 2-1 to 2-9]

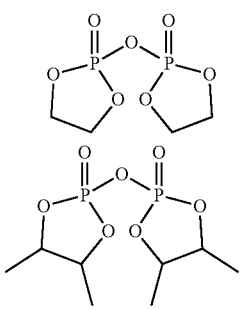

-continued

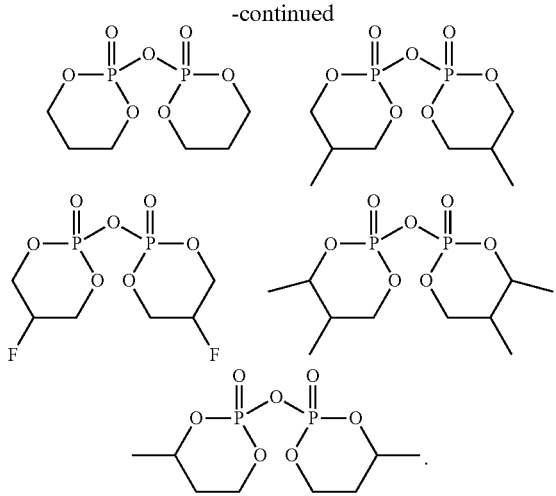

13. The method according to claim 1, wherein a yield of the reaction is 60% or more.

14. The method according to claim 1, wherein the compound represented by Chemical Formula 1 is obtained by oxidizing a halohyproxy-based compound in a hydrophobic solvent having a boiling point higher than that of the hydrophobic solvent.

15. The method according to claim 14, wherein the halohyproxy-based compound is obtained by reacting phosphorus trichloride and ethylene glycol in a hydrophobic solvent having a boiling point lower than that of the hydrophobic solvent.

16. The method according to claim 1, wherein the compound represented by Chemical Formula 1 is 2-chloro-2-oxo-1,3,2-dioxaphospholane, 2-bromo-2-oxo-1,3,2-dioxaphospholane, 2-fluoro-2-oxo-1,3,2-dioxaphospholane, or 2-iodo-2-oxo-1,3,2-dioxaphospholane, and the compound represented by Chemical Formula 2 is 2,2'-oxobis(1,3,2-dioxaphospholane 2-oxide).

* * * * *